Patented Dec. 27, 1927.

1,654,297

UNITED STATES PATENT OFFICE.

FRANK SIGFRID MALM, OF CHICAGO, ILLINOIS, ASSIGNOR TO WESTERN ELECTRIC COMPANY, INCORPORATED, OF NEW YORK, N. Y., A CORPORATION OF NEW YORK.

ADHESIVE COMPOUND.

No Drawing. Application filed April 11, 1923. Serial No. 631,360.

This invention relates to improvements in adhesive compounds, and more particularly to a compound of this type which will remain viscous at relatively high temperatures and be closely adherent to metallic surfaces even where such surfaces have a comparatively high polish.

An adhesive compound made in accordance with this invention is particularly adaptable for use in the manufacture of cable plugs of the type disclosed in my copending application, Serial No. 630,201, filed April 6, 1923, the compound being used to seal the space between the inside of the lead sheath and the outside of the cable core.

Another object of the invention is to produce a material of this type which remains viscous at temperatures as high as 250° F.

A satisfactory adhesive compound of this type may comprise a plastic gum, an adhesive material which also has a softening action upon the plastic gum, and a fibrous filling material to give the compound a relatively high viscosity. The fibers intermingle and accumulate in any small passages through which the compound may have a tendency to flow and thus obstruct the free flow thereof.

The plastic gum may be crude or plantation rubber, gutta percha, balata, pontianac, or the like. Preferably I employ washed and dried crude or plantation rubber softened with rosin and rosin oil which are also adhesive materials, the mixture being filled with asbestos fibers. Asbestos fibers are preferably employed since the compound may be subjected to temperatures as high as 250° F., especially where the compound is used as an adhesive and sealing material in the manufacture of cable plugs.

I find that a satisfactory compound may be made using the following materials in the proportions stated:

| | Per cent. |
|---|---|
| Washed and dried crude rubber or plantation rubber | 59 |
| Rosin oil | 6 |
| Rosin | 23 |
| Asbestos fibers | 12 |
| | 100 |

A compound embodying these ingredients in the proportions shown will remain tacky and adhesive from temperatures ranging between about 32° F. and 250° F. or at any temperature to which it is subjected during its use in cable plugs. Its consistency is such that it will adhere to metallic surfaces even where such surfaces have a comparatively high polish.

What is claimed is:

1. An adhesive compound comprising a plastic gum, rosin and rosin oil, and a fibrous filler.

2. An adhesive compound comprising rubber, rosin and rosin oil, and a fibrous filler comprising asbestos fibers.

3. An adhesive compound comprising plastic gum approximately 59 per cent, softening adhesive material of rosin and rosin oil approximately 29 per cent, and fibrous filling material approximately 12 per cent.

4. An adhesive compound comprising rubber 59 per cent, rosin oil 6 per cent, rosin 23 per cent, and asbestos fibers 12 per cent.

In witness whereof, I hereunto subscribe my name this 27 day of March A. D., 1923.

FRANK SIGFRID MALM.